(12) United States Patent
Peng

(10) Patent No.: US 11,187,636 B1
(45) Date of Patent: Nov. 30, 2021

(54) DIELECTROSTRICTION MEASUREMENT WITH ELECTRICAL EXCITATION FREQUENCY SWEEP METHOD AND RHEO-DIELECTRIC COEFFICIENT FOR PROCESS MONITORING, QUALITY EXAMINATION, AND MATERIAL CHARACTERIZATION

(71) Applicant: Kelvin Innovations LLC, Madison, WI (US)

(72) Inventor: Yiyan Peng, Madison, WI (US)

(73) Assignee: Kelvin Innovations LLC, Madison, WI (US)

( * ) Notice: Subject to any disclaimer, the term of this patent is extended or adjusted under 35 U.S.C. 154(b) by 196 days.

(21) Appl. No.: 16/256,653

(22) Filed: Jan. 24, 2019

Related U.S. Application Data

(60) Provisional application No. 62/622,607, filed on Jan. 26, 2018.

(51) Int. Cl.
*G01N 11/02* (2006.01)
*G01B 7/16* (2006.01)
(Continued)

(52) U.S. Cl.
CPC .............. *G01N 11/02* (2013.01); *G01B 7/22* (2013.01); *G01L 1/142* (2013.01);
(Continued)

(58) Field of Classification Search
CPC ... G01N 11/162; G01N 11/165; G01N 11/167
See application file for complete search history.

(56) References Cited

U.S. PATENT DOCUMENTS 4,862,384 A * 8/1989 Bujard .................. G01N 11/00
73/599
5,279,149 A * 1/1994 Williams ............... G01N 11/00
73/54.01
(Continued)

OTHER PUBLICATIONS

Landau and Lifshitz, Institute of Physical Problems, USSR Academy of Sciences, "Electrodynamics of Continuous Media," vol. 8 of Course of Theoretical Physics, $2^{nd}$ Edition, Copyright 1984 Pergamon Press Ltd., pp. 59-67.
(Continued)

*Primary Examiner* — Tran M. Tran
(74) *Attorney, Agent, or Firm* — Boardman & Clark LLP

(57) ABSTRACT

A method for detecting components of dielectric materials is disclosed. The method includes use of a sensor to obtain at least one of a strain-dielectric coefficient data series at multiple frequencies or a stress-dielectric coefficient data series at multiple frequencies and using a processor to analyze resulting data, when a strain field or a stress field is known. The method also includes use of a sensor to obtain rheo-dielectric coefficient data at single frequency or data series at multiple frequencies and using a processor to analyze resulting data, when shear rate is known. The resulting data is used to perform material process or operation monitoring and control, quality examination, and characterization. Systems for detecting components of dielectric materials and for dielectrostriction measurement are also disclosed.

7 Claims, 10 Drawing Sheets

(51) Int. Cl.
*G01L 1/14* (2006.01)
*G01N 11/00* (2006.01)

(52) U.S. Cl.
CPC ........... *G01N 2011/0033* (2013.01); *G01N 2203/0094* (2013.01); *G01N 2203/0617* (2013.01)

(56) References Cited

U.S. PATENT DOCUMENTS

| | | | | |
|---|---|---|---|---|
| 5,798,452 | A * | 8/1998 | Martin | G01N 9/002 73/32 R |
| 5,889,351 | A * | 3/1999 | Okumura | G01N 11/16 310/312 |
| 6,907,353 | B2 * | 6/2005 | Sanchez Pina | G01F 1/28 702/30 |
| 6,910,385 | B2 * | 6/2005 | Shkel | G01L 1/005 73/780 |
| 7,104,117 | B2 * | 9/2006 | Buttgenbach | G01N 33/2888 73/53.05 |
| 7,302,830 | B2 * | 12/2007 | Kolosov | G01N 9/32 73/53.01 |
| 7,334,452 | B2 * | 2/2008 | Matsiev | G01H 13/00 73/24.06 |
| 7,694,551 | B2 * | 4/2010 | Jakoby | G01N 11/16 73/54.26 |
| 7,726,199 | B2 * | 6/2010 | Shkel | G01B 7/22 73/780 |
| 7,878,044 | B2 * | 2/2011 | Andle | G01N 9/002 73/24.06 |
| 8,475,703 | B2 * | 7/2013 | Turng | B29C 70/62 264/437 |
| 8,881,577 | B1 * | 11/2014 | Agar | G01N 9/00 73/54.06 |
| 9,038,443 | B1 * | 5/2015 | Pace | G01H 13/00 73/64.53 |
| 9,097,635 | B2 * | 8/2015 | Hayashi | G01N 11/165 |
| 9,645,117 | B2 * | 5/2017 | Tanabe | H03H 9/15 |
| 10,191,309 | B2 * | 1/2019 | Zou | G01N 11/00 |
| 10,317,557 | B2 * | 6/2019 | Gonzalez | G01N 9/002 |
| 2006/0277978 | A1 * | 12/2006 | Jakoby | G01N 11/16 73/54.02 |
| 2015/0059446 | A1 * | 3/2015 | Agar | G01N 11/00 73/54.02 |
| 2016/0334317 | A1 * | 11/2016 | Killard | G01N 11/16 |
| 2018/0231518 | A1 * | 8/2018 | Vaidya | G01N 11/00 |
| 2019/0250176 | A1 * | 8/2019 | Bell | G01N 29/222 |
| 2019/0331577 | A1 * | 10/2019 | Leyser | G01N 11/162 |

OTHER PUBLICATIONS

Julius Adams Stratton, Massachusetts Institute of Technology, "Electromagnetic Theory," Copyright 1941 The McGraw-Hill Book Company, Inc., pp. 137-146.
Gerald G. Fuller, Department of Engineering, Stanford University, "Optical Rheometry of Complex Fluids," Copyright 1995 Oxford University Press, Inc., pp. 146-148.
H. Janeschitz-Kriegl, Johannes-Kepler-Universität, Linz, "Polymer Melt Rheology and Flow Birefringence," Copyright 1983 Springer-Verlag Berlin Heidelberg, pp. 91-121.
Riande and Saiz, Prentice Hall Polymer Science and Engineering Series, "Dipole Moments and Birefringence of Polymers," Copyright ___ Prentice Hall, pp. 266-279.
R. Byron Bird et al., "Dynamics of Polymeric Liquids," vol. 2 Kinetic Theory, $2^{nd}$ Edition, Copyright 1987 John Wiley & Sons, Inc., pp. 155-161.
Yiyan Peng et al., Dept. of Mechanical Engineering, University of Wisconsin Madison, "Stress dielectric response in liquid polymers," Copyright 2005 The Society of Rheology, Inc., J. Rheol. 49(1), Jan./Feb. 2005, pp. 297-311.
Yiyan Peng, "Rheo-Dielectric Studies in Polymeric System," A thesis submitted in partial fulfillment of the requirements for the degree of Doctor of Philosophy (Mechanical Engineering), University of Wisconsin Madison, 2007, pp. 42-51.
Yiyan Peng et al., "Development of a Rheo-Dielectric Sensor for Online Shear Stress Measurement During the Injection Molding Process," Polymer Engineering and Science, 2010, pp. 61-68.
Yiyan Peng et al., "Rheo-Dielectrio Study in Polymeric Nano-Suspensions," Proceedings of the IMECE2006, 2006 ASME International Mechanical Engineering Congress and Exposition, Nov. 5-10, 2006, Chicago, Illinois, USA, pp. 449-456.
Ernest O. Doebelin, "Measurement Systems—Application and Design," $4^{th}$ Edition, Copyright 1990 McGraw-Hill, Inc., pp. 254-261.
J. P. Holman, "Experimental Methods for Engineers," $8^{th}$ Edition, Copyright 2012 The McGraw-Hill Companies, Inc., pp. 205-217.
Horowitz and Hill, "The Art of Electronics," $2^{nd}$ Edition, Copyright 1989 Cambridge University Press, pp. 1002-1004.
Yonggang and Jie, "A rheological model for lithium lubricating grease," Tribology International vol. 31, No. 10, 1998, pp. 619-625.
Baart et al., "Non-Newtonian Effects on Film Formation in Grease-Lubricated Radial Lip Seals," 2010, Tribology Transactions, 53:3, pp. 308-318.

* cited by examiner

DIELECTROSTRICTION MEASUREMENT WITH ELECTRICAL EXCITATION FREQUENCY SWEEP METHOD AND RHEO-DIELECTRIC COEFFICIENT FOR PROCESS MONITORING, QUALITY EXAMINATION, AND MATERIAL CHARACTERIZATION

CROSS-REFERENCE TO RELATED APPLICATIONS

This application claims priority to U.S. Provisional Patent Application, Ser. No. 62/622,607, filed Jan. 26, 2018, entitled DIELECTROSTRICTION MEASUREMENT WITH ELECTRICAL EXCITATION FREQUENCY SWEEP METHOD FOR PROCESS MONITORING, QUALITY EXAMINATION, AND MATERIAL CHARACTERIZATION the entire contents of which is hereby incorporated by reference herein in its entirety.

FIELD

The present invention(s) are directed to dielectrostrictive sensors and their use in material characterization, quality examination, and process monitoring.

BACKGROUND

Dielectrostriction is a rheo-dielectric phenomenon, describing the variation of dielectric properties of a material with deformation; it is a fundamental property of any dielectric material. When a dielectric material is under deformation, the relative positions of dipoles and the local electric field in the material are changed, which leads to a change in dielectric properties [1, 2].

A linear relationship exists between the change of dielectric constant and stress of dielectric material under deformation. This relationship may be defined by the stress-dielectric rule. A dielectrostrictive sensor exists for strain and stress measurement, (see U.S. Pat. No. 7,726,199). This sensor has been modified (see U.S. App. No. 2017/0122820) as to electrode pattern. In addition, U.S. App. No. 2017/0122820 further discloses that the stress-dielectric coefficient is very sensitive to material structure and composition.

In the above-referenced issued patent and pending application, the electrical excitation voltage used to polarize the dielectric material is set at a single frequency, and strain-dielectric coefficient, $\alpha_1$, the stress-dielectric coefficient, $\lambda_1$, and dielectrostrictive response are investigated at a single frequency for process control and material quality examination.

These prior approaches have certain limitations. For example, material characterization may be difficult using the prior approaches, particularly where a material to be tested is comprised of multiple components or ingredients.

Moreover, in the above issued patent and pending application, either strain or stress field is known and therefore chosen to be state variable, then the corresponding strain-dielectric or stress-dielectric coefficients at single frequency are obtained by dielectrostriction measurement. These prior approaches have certain limitations as well, as in some situation, strain and stress field might be unknown, but only shear rate is known.

A need exists for a system and method for detecting components of dielectric materials.

SUMMARY

The disclosed invention seeks to remedy these and other limitations. Disclosed, therefore, is a system and method for detecting components of dielectric materials. This approach may be used across dielectric materials or materials having dielectric properties. Dielectric materials include, but are not limited to, polymers, composites, foods, greases, biofluids, ceramics, semiconductor materials, and other materials and equivalents. The system and method described herein includes, in various embodiments, 1) obtaining strain-dielectric and/or stress-dielectric coefficients data series at multiple frequencies, as well as analyzing resulting data when strain or stress field is known; 2) obtaining rheo-dielectric coefficient $\eta\lambda_1/\sqrt{\varepsilon}$ data at single frequency or data series at multiple frequencies as well as analyzing resulting data, when shear rate is known.

By sweeping the electrical excitation frequency, either discrete or continuous, a set of strain-dielectric and/or stress-dielectric coefficients data at different frequencies can be obtained. This frequency sweep method can increase the sensitivity and resolution of dielectrostrictive measurement in process monitoring, and material structure, composition, and property change detection as compared to a single frequency method. Moreover, dielectrostrictive measurement combined with an electrical excitation frequency sweep method can help with material characterization (to help determine component or ingredient changes in material), which is difficult to do when the strain-dielectric and stress-dielectric coefficients obtained at the signal electrical frequency. For instance, in grease, iron, copper, nylon, and water are the main factors causing grease failure. At a single electrical frequency, some of them have similar trends in stress-dielectric coefficient, $\lambda_1$, but by using multiple electrical frequencies, it is possible to obtain a set of stress-dielectric coefficient for each of them, and which coefficients vs. frequency exhibit different trends among them.

Furthermore, in some examples of embodiments, where the strain and stress fields might not be known, but only shear rate is known, a rheo-dielectric coefficient $\eta\lambda_1/\sqrt{\varepsilon}$ at single electrical frequency or its data series at multiple frequencies, can be obtained for material characterization.

In summary, when strain or stress field is known and chosen at state variable of deformation, after obtaining the strain-dielectric and/or stress-dielectric coefficients data series at multiple electrical frequencies, a strain-dielectric coefficient vs. electrical frequency and/or stress-dielectric coefficient vs. electrical frequency data array, table, curve, trend, or pattern can be formed. In some examples of embodiments, this may be called a strain/stress-dielectric coefficient spectrum. Based on this spectrum, process monitoring, material structure, composition, and property change detection, and material characterization can be performed.

When shear rate is known and chosen at state variable of deformation, a rheo-dielectric coefficient $\eta\lambda_1/\sqrt{\varepsilon}$ at single frequency or its data series at multiple frequencies can be obtained. For data series obtained at multiple frequencies, a rheo-dielectric coefficient vs. frequency data array, table, curve, trend, or pattern can be obtained. In some examples of embodiments, this may be called a rheo-dielectric coefficient spectrum.

Then based on this spectrum, process monitoring, material structure, composition, and property change detection, and material characterization can be performed.

To obtain the rheo-dielectric coefficient $\eta\lambda_1/\sqrt{\varepsilon}$, a two-element sensor rosette with two differently orientated sensors, as shown in FIG. 1, is employed when both magnitude and direction of shear rate are known (note, the configuration of the two-element sensor rosette is described in U.S. Pat. No. 7,726,199 and U.S. App. No. 2017/0122820).

According to stress-dielectric rule [7] and the work function of dielectrostrive sensor [7-11], when dielectric material is under shear deformation, the capacitance difference $C_{\theta 1} - C_{\theta 2}$ of the two differently oriented sensors in terms of shear stress $\sigma_{yz}$ is $$C_{\theta 1} - C_{\theta 2} = \frac{C^0}{4\varepsilon} \sigma_{yz}^2 \lambda_1^2 (\cos 2\theta_1 - \cos 2\theta_2), \quad (1)$$

where $\varepsilon$ is the dielectric constant of dielectric material before deformation, $C^0$ is the capacitance of two sensors before deformation, $\lambda_1$ is stress-dielectric coefficient, $\theta_1$ and $\theta_2$ are the angles of two sensor electrodes with respective to y-axis and are known.

For a material without yield stress $\sigma_y = 0$, $\sigma_{yz}$ can be related to shear rate $\dot{\gamma}$ as $$\sigma_{yz} = \sigma = \eta\dot{\gamma}. \quad (2)$$

For a material with yield stress $\sigma_y \neq 0$, $\sigma_{yz}$ can be related to shear rate $\dot{\gamma}$ as $$\sigma_y = \sigma - \sigma_y = \eta\dot{\gamma}, \quad (3)$$

where $\sigma$ is measured shear stress and $\eta$ is the viscosity of the material.

Substituting Eq.(2) or Eq.(3) into Eq.(1), the capacitance difference of the two differently oriented sensors can be expressed in terms of shear rate $\dot{\gamma}$, $$C_{\theta 1} - C_{\theta 2} = \frac{C^0}{4}\left(\frac{\eta\lambda_1}{\sqrt{\varepsilon}}\right)^2 \dot{\gamma}^2 (\cos 2\theta_1 - \cos 2\theta_2). \quad (4)$$

Once the capacitance difference is measured, the rheo-dielectric coefficient $\eta\lambda_1/\sqrt{\varepsilon}$ of the dielectric material can be obtained.

In the situation where only the magnitude of shear stress is known, but its direction is not known, a three-element sensor rosette with three differently oriented sensors, as shown in FIG. 2, may be employed to obtain the rheo-dielectric coefficient (note, the configuration of a three-element rosette is described in U.S. Pat. No. 7,726,199 and U.S. App. No. 2017/0122820).

The capacitances of any two of these sensors in terms of shear stress are $$C_{\theta+\theta 1} - C_\theta = \frac{C^0}{4\varepsilon}\sigma_{yz}^2\lambda_1^2(\cos 2\theta \cos 2\theta_1 - \sin 2\theta \sin 2\theta_1 - \cos 2\theta), \quad (5)$$

$$C_{\theta+\theta 2} - C_\theta = \frac{C^0}{4\varepsilon}\sigma_{yz}^2\lambda_1^2(\cos 2\theta \cos 2\theta_2 - \sin 2\theta \sin 2\theta_2 - \cos 2\theta),$$

where angels $\theta_1$ and $\theta_2$ are unknown, but $\theta_2 - \theta_1$ is known and angle $\theta$ is known, Substituting Eq.(2) or Eq.(3) into Eq.(5), the capacitance difference of any two differently oriented sensors can be expressed in terms of shear rate $\dot{\gamma}$, $$C_{\theta+\theta 1} - C_\theta = \frac{C^0}{4}\left(\frac{\eta\lambda_1}{\sqrt{\varepsilon}}\right)^2 \dot{\gamma}^2 (\cos 2\theta \cos 2\theta_1 - \sin 2\theta \sin 2\theta_1 - \cos 2\theta) \quad (6)$$

$$C_{\theta+\theta 2} - C_\theta = \frac{C^0}{4}\left(\frac{\eta\lambda_1}{\sqrt{\varepsilon}}\right)^2 \dot{\gamma}^2 (\cos 2\theta \cos 2\theta_2 - \sin 2\theta \sin 2\theta_2 - \cos 2\theta).$$

By measuring capacitance differences of two pairs of sensors, the rheo-dielectric coefficient $\eta\lambda_1/\sqrt{\varepsilon}$ of the dielectric material can be obtained.

Accordingly, a method for detecting components of dielectric materials is disclosed. The method includes use of a sensor to obtain at least one of a strain-dielectric coefficient data series at multiple frequencies or a stress-dielectric coefficient data series at multiple frequencies and using a processor to analyze resulting data, when a strain field or a stress field is known. The method also includes use of a sensor to obtain rheo-dielectric coefficient data at single frequency or data series at multiple frequencies and using a processor to analyze resulting data, when shear rate is known. The resulting data is used to perform material process or operation monitoring and control, quality examination, and characterization.

A system for detecting components of dielectric materials is also disclosed. The system includes a device arranged to deliver an electrical excitation voltage, a dielectrostrictive sensor for conducting dielectrostriction measurement, and a controller configured to carry out or control one or more actions of the device and the dielectrostrictive sensor and process detected dielectrostriction measurement data from the dielectrostrictive sensor.

An additional system for detecting components of dielectric materials is disclosed. This system includes a device having or providing oscillatory or steady-state shear deformation or shear flow on a surface. At least two sensors and a circuit configured to detect responses of the sensors and also provided. The system further includes a function generator providing excitation voltage. When deformation or flow direction is known, the at least two sensors comprise two differently oriented planar sensors attached to the surface. When deformation or flow direction is not known, the at least two sensors comprise three differently oriented planar sensors attached to the surface. For example, for off-line measurement, a device such as rheometer or dynamic mechanical analyzer producing or providing oscillatory or steady-state shear deformation or shear flow on a surface may be used. However, for on-line or in-situ measurement a sensor can be attached to any location where there is a shear deformation or flow, no matter how this deformation or flow is generated. To this end, the sensor may be attached just a body surface where there is a shear deformation or flow on it. For instance, a sensor could be attached to a pipe with liquid flowing through it, or just a surface with liquid flowing on it. The shear flow might also be generated just by gravity.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein.

Figure 1:
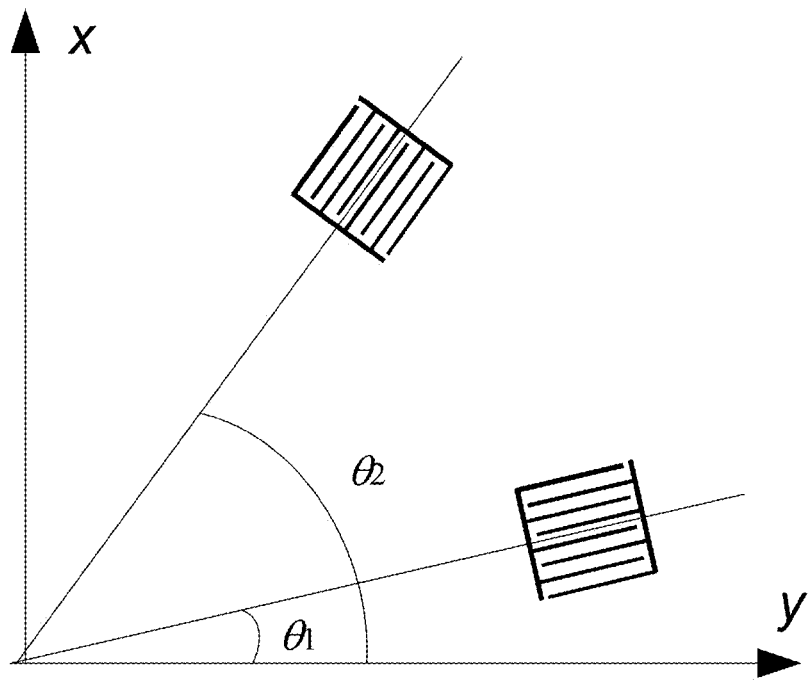
FIG. 1 is a planar sensor rosette with two sensors oriented at different directions, $\theta_1$, and $\theta_2$ with respect to the y-axis.
Figure 2:
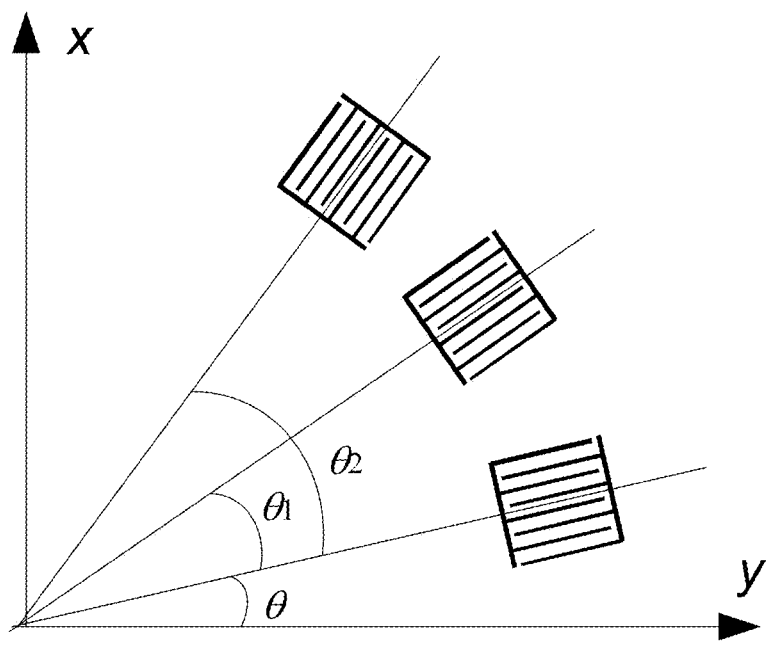
FIG. 2 is a planar sensor rosette with three sensors oriented at different directions.

It should be understood that the drawings are not necessarily to scale. In certain instances, details that are not necessary to the understanding of the invention or render other details difficult to perceive may have been omitted. For ease of understanding and simplicity, common numbering of elements within the numerous illustrations is utilized when the element is the same in different Figures. It should be understood, of course, that the invention is not necessarily limited to the particular embodiments illustrated herein.

DETAILED DESCRIPTION

A detailed discussion of one or more example systems or methods is provided below. This disclosure is non-limiting.

For example, while the dielectrostriction measurement may be described as conducted at two different frequencies, this may be understood as one example of a sweep frequency (or multiple frequencies) method. In other words, among other things, this disclosure should be understood to extend to more than two frequencies. Likewise, while particular embodiments and experimental data are included in the below detailed disclosure, these embodiments and experimental data should be understood as non-limiting examples.

In one or more examples of embodiments, the system and method may be performed with various devices that provide a necessary electrical excitation voltage. These devices may include either discrete or continuous devices, including but not limited to, a function generator, lock-in amplifier, impedance analyzer, LCR meter and any integrated circuits with electrical frequency sweep or multiple frequency capacity. A dielectrostrictive sensor for conducting dielectrostriction measurement may also be employed, and in one or more examples of embodiments, may comprise a type similar to that described in U.S. Pat. No. 7,726,199 and/or U.S. App. No. 2017/0122820, which are hereby incorporated herein by reference. In this regard, a sensor rosette may be provided for measurement. However, any other suitable device for obtaining strain-dielectric and/or stress-dielectric coefficients may likewise be used in the system and method herein. The system utilizing one or more sensors and other devices as described herein may include a controller taking the form of one or more electrical components or circuits. For example, the controller may comprise a processor being programmed or otherwise configured to carry out or control any of the actions and/or computations described herein.

Dielectrostriction is a rheo-dielectric phenomenon which describes the variation of dielectric properties of a material with deformation, and is a fundamental property of any dielectric material including polymers and greases. A linear relationship has been observed between the change in the dielectric constant and the stresses of polymers, and is named the stress-dielectric rule. For an initially isotropic material, two independent material coefficients, $\lambda_1$ and $\lambda_2$, are required to describe the dielectrostriction effect in terms of stress. Like polymers, greases are also dielectric materials; hence, the change of their dielectric properties with deformation can be expected as well. In this study, the stress-dielectric relationship is investigated in greases for the first time. The dielectrostriction effect is observed, and the first stress-dielectric coefficient, $\lambda_1$, is measured and compared for a grease and its mixtures with 1.5% by weight of iron particle, copper particle, nylon powder, and deionized (DI) water respectively in an oscillatory shear flow at two different excitation frequencies of 0.1 Hz and 10 kHz. The results reveal a linear relationship between the dielectric constant variation and stresses for all grease samples. Moreover, it has been found that the grease samples with different additives exhibit different dielectrostrictive behaviors and possess different first stress-dielectric coefficient, $\lambda_1$, at different excitation frequencies. This study suggests a novel approach to the rheological study, stress measurement, and performance monitoring of greases.

Dielectric constant of a deformed isotropic material is described by the second-order tensor, $\varepsilon_{ij}$, which can be approximated as a linear function of strain tensor $u_{ij}$ [1, 2], $$\varepsilon_{ij} = \varepsilon \delta_{ij} + \alpha_1 u_{ij} + \alpha_2 u_{\parallel} \delta_{ij}, \quad (7)$$

where $u_{\parallel} = u_{11} + u_{22} + u_{33}$. $\delta_{ij}$ denotes Kronecker delta. $\varepsilon$ is the dielectric constant of the material before deformation. $\alpha_1$ and $\alpha_2$ are the strain-dielectric coefficients, which are also called the electrostriction parameters. Small variations of dielectric properties with deformation are required to justify the assumption of the linear strain-dielectric relationship in Eq.(7), namely, $$\|\alpha_1 u_{ij}\| \ll \varepsilon, \text{ and } |\alpha_2 u_{ll}| \ll \varepsilon. \tag{8}$$

The single and double line brackets indicate the magnitudes of the scalar and tensor components.

Dielectrostriction has a physical basis similar to the well-known deformation-induced birefringence. Both phenomena involve a polarization mechanism and a change in material microstructure. Moreover, the deformation-induced birefringence can be considered a manifestation of dielectrostriction in the optical range of the electromagnetic spectrum. However, birefringence measurement is limited to transparent materials because birefringence only involves electronic polarization. Polarization mechanisms (e.g., ionic, dipolar, atomic, or electronic polarization mechanisms) can contribute to dielectrostriction. Therefore, the dielectrostriction measurement is applicable to both transparent and opaque materials, and is feasible over a wide frequency range of electromagnetic spectrum, which enables one to choose specific frequency or frequency range to maximize the dielectrostrictive response of a species of particular interest.

The rheo-optical method has been widely used in the rheological studies of polymers because a linear relationship exists between stress and birefringence, which is named the stress-optical rule and given in the equation below [3-5], $$n_{ij} = n\delta_{ij} + C_1\sigma_{ij} + C_2\sigma_{\|}\delta_{ij}, \tag{9}$$

where n is the refractive index of an originally isotropic material; $n_{ij}$ and $\sigma_{ij}$ are the refractive index and stress tensors, respectively; $C_1$ and $C_2$ are the stress-optical coefficients. The stress-optical rule holds well for many polymer melts and solutions even far into the nonlinear stress-shear rate region, because both stress and birefringence are governed by the orientation of molecule chains before the molecule chains are fully stretched and the orientation is saturated. So far, the linear stress-optical relationship has been proven by the overwhelming majority of practical experiments relevant to polymer processing and all experiments in shear flow [4, 6].

i) Due to the similar physical mechanisms between dielectrostriction and deformation-induced birefringence, a linear relationship between stress, $\sigma_{ij}$, and dielectric constant, $\varepsilon_{ij}$, has been found for polymers under deformation or during flow in a form similar to the stress-optical rule, which is named the stress-dielectric rule [7], ii) $\varepsilon_{ij} = \varepsilon\delta_{ij} + \lambda_1\sigma_{ij} + \lambda_2\sigma_{\|}\delta_{ij},$ (10)

iii) where $\sigma_{\|} = \sigma_{11} + \sigma_{22} + \sigma_{33}$; $\lambda_1$ and $\lambda_2$ are the stress-dielectric coefficients.

A capacitive sensor has been developed for dielectrostriction measurement [7-9]. It has a planar configuration that can be easily scaled down to a very small size, which makes dielectrostriction measurement applicable for both off-line and on-line implementations [10]. Traditional approaches for rheological study, such as mechanical and optical methods, are usually not suitable for on-line measurements.

An on-line system for measuring grease rheological properties, such as viscosity and stress, and detecting grease composition change due to bleeding, the loss of additives, and/or accumulated molecular modification and debris would be immensely useful for grease property and performance monitoring and revealing lubrication effectiveness. Like polymers, greases are dielectric materials; the dielectric properties of greases should vary with stresses and deformations as well. However, greases are mixtures of multiple materials involving a number of additives and therefore may exhibit a more complex rheological behavior than polymers.

Accordingly, the disclosure herein explores the stress-dielectric relationship in greases during shear flow, and explores the first stress-dielectric coefficient, $\lambda_1$, in grease and its mixtures with different additives at two different excitation electrical frequencies. The concept of using planar capacitive sensors for dielectrostriction study is introduced below. The rheological properties, dielectrostrictive responses, and their relationships of the grease and its mixtures are also presented. Then the first stress-dielectric coefficients, $\lambda_1$, of the grease and its mixtures measured at different frequencies are compared and discussed.

Planar Capacitive Sensor and Shear Dielectrostriction

In one or more examples of embodiments, a planar capacitive sensor has been developed to conduct the dielectricition measurement and study the rheo-dielectric relationship [7-9]. When such sensor is placed adjacent to a dielectric material, the change in the dielectric constant of the material caused by deformation may be captured by the capacitance change of the sensor. For clarity, the following briefly reviews the working principle of this planar capacitive sensor and a sensor rosette having two differently oriented sensors used to decouple and measure the strain/stress-dielectric coefficients.

Figure 3:
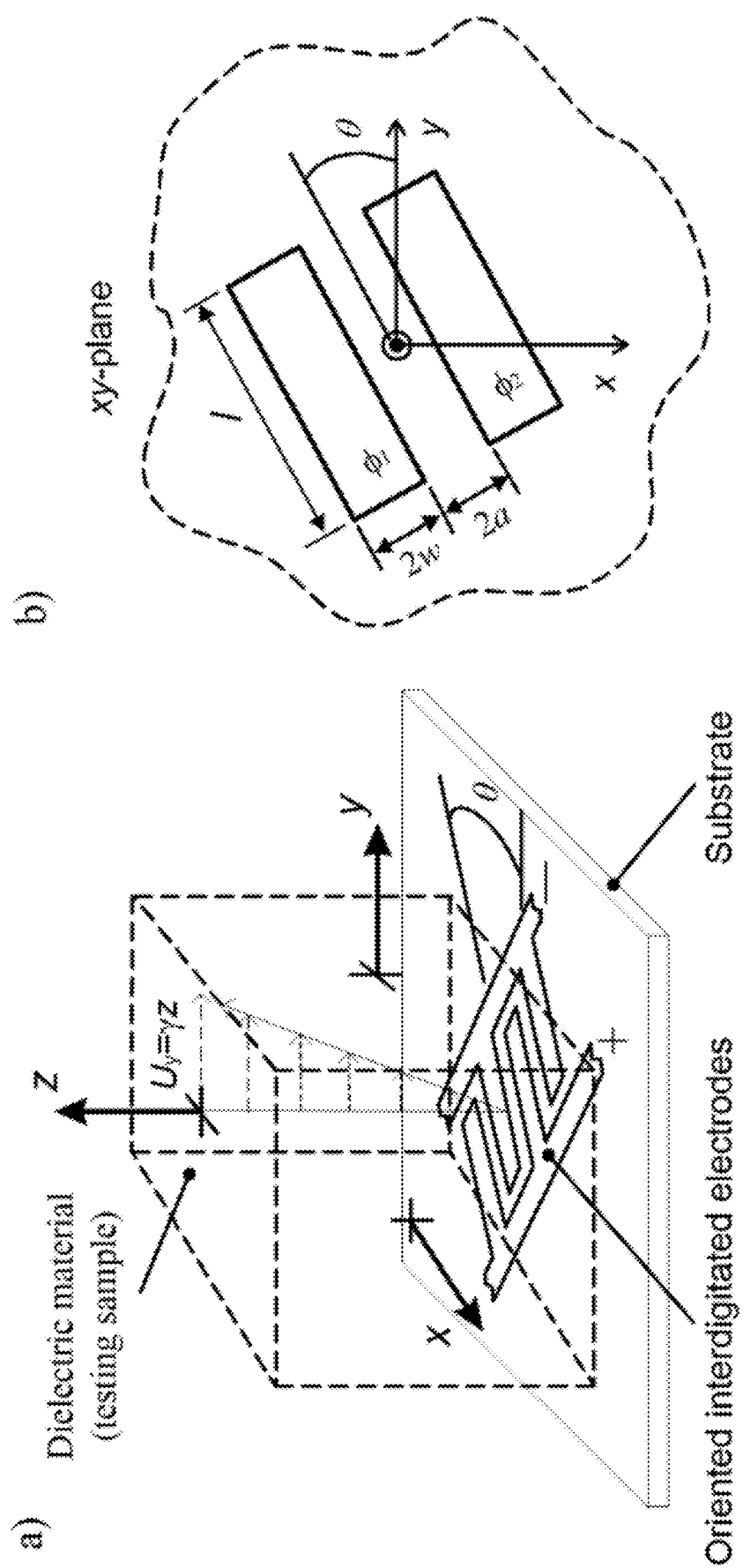
FIG. 3 is an illustration of a planar capacitive sensor.

FIG. 3 shows an illustration of a planar capacitive sensor. In FIG. 3(a), an initially isotropic material is subjected to a shear displacement, $u_y = \gamma z$. Inter-digitated electrodes deposited on a non-conductive substrate are located in the xy-plane and form an angle, $\theta$, with respect to the y-axis. In FIG. 3(b), each electrode strip has 2w in width, l in length, and is separated from each other by 2a.

The planar capacitive sensor has inter-digitated electrodes deposited on a non-conductive substrate, as shown in FIG. 3. The inter-digitated electrodes have equal width, W=2w, and are separated by a distance, Ata. Both the thickness of the dielectric material on top of the electrodes, h, (which is not shown in FIG. 3), and the length of the electrode, l, are much larger than the electrode width and separation (h,l>>W,A). The electrodes in FIG. 3 are located in the xy-plane and form an angle, $\theta$, with respect to the y-axis. The capacitance, $C_\theta$, of such a planar sensor is [8]

$$C_\theta = C_0(\varepsilon_{\textit{effective}} + \varepsilon_s), \text{ and} \tag{11}$$

$$\varepsilon_{\textit{effective}} = [(\varepsilon_{xx}\varepsilon_{zz} - \varepsilon_{xz}^2)\cos^2\theta + (\varepsilon_{yy}\varepsilon_{zz} - \varepsilon_{yz}^2)\sin^2\theta + 2(\varepsilon_{xy}\varepsilon_{zz} - \varepsilon_{xz}\varepsilon_{yz})\cos\theta\sin\theta]^{\frac{1}{2}}$$

where $\varepsilon_s$ is the dielectric constant of the sensor substrate, and $\varepsilon_{\textit{effective}}$ is the effective dielectric constant of the dielectric material. For an isotropic material before deformation, $\varepsilon_{\textit{effective}} = \varepsilon$. $2C_0$ represents the capacitance of the electrodes in free space. Therefore, the capacitance of the sensor before deformation is $C_\theta = C_0(\varepsilon + \varepsilon_s)$. The value of $C_0$ can be obtained experimentally or estimated as $$C_0 = \frac{\varepsilon_0 L}{\pi} \ln\left(1 + \frac{w}{a}\right),$$

where $\varepsilon_0 (=8.85 \times 10^{-12}$ F/m) is the permittivity of free space, parameter L is the combined length of all electrode strips.

Consider a dielectric viscoelastic material such as grease under a shear deformation, $U_y = \gamma z$, (as shown in FIG. 3(a)), where $U_y$ is the displacement along y direction and $\gamma$ is the engineering shear strain, the strain and stress tensors can be expressed respectively as, $$u = \begin{bmatrix} 0 & 0 & 0 \\ 0 & 0 & \gamma/2 \\ 0 & \gamma/2 & \gamma^2/2 \end{bmatrix} \text{ and } \sigma = \begin{bmatrix} \sigma_{xx} & 0 & 0 \\ 0 & \sigma_{yy} & \sigma_{yz} \\ 0 & \sigma_{yz} & \sigma_{zz} \end{bmatrix}. \quad (12)$$

The normal stresses generated in the shear flow is attributed to the elasticity of grease [6]. If the linear strain-dielectric relationship is assumed (Eq.(7)), substituting the above strain components into the strain-dielectric relationship, and then into sensor capacitance expression (Eq.(11)), the capacitance of an arbitrary oriented sensor can be expressed in terms of engineering strain $\gamma$, $$C_\theta = C_0\left(\varepsilon + \frac{2\varepsilon\alpha_1 + 4\varepsilon\alpha_2 - \alpha_1^2 \sin^2\theta}{8\varepsilon}\gamma^2 + \frac{\alpha_1\alpha_2 + \alpha_2^2}{8\varepsilon}\gamma^4 + \varepsilon_s\right). \quad (13)$$

If the deformation is small, the higher order item ($\gamma^4$) can be neglected, Eq.(13) reduces to $$C_\theta = C_0\left(\varepsilon + \frac{2\varepsilon\alpha_1 + 4\varepsilon\alpha_2 - \alpha_1^2 \sin^2\theta}{8\varepsilon}\gamma^2 + \varepsilon_s\right). \quad (14)$$

Eqs. (13) and (14) reveal that two strain-dielectric coefficients, $\alpha_1$ and $\alpha_2$, can be decoupled by using two differently oriented sensors, and $\alpha_1$ can be solved from $$C_{\theta 1} - C_{\theta 2} = \frac{C_0}{16\varepsilon}\alpha_1^2\gamma^2(\cos 2\theta_1 - \cos 2\theta_2). \quad (15)$$

The capacitance equation can also be expressed in terms of stresses by substituting the stress components into the stress-dielectric relationship (Eq.(10)), and then into sensor capacitance expression as in Eq.(11), $$C_\theta = C_0 \begin{pmatrix} \varepsilon + \frac{1}{2}(\lambda_1\sigma_{xx}\cos^2\theta + \lambda_1\sigma_{yy}\sin^2\theta + \lambda_1\sigma_{zz} + 2\lambda_2\sigma_{II}) + \\ (\lambda_1\sigma_{xx}\cos^2\theta + \lambda_1\sigma_{yy}\sin^2\theta + \lambda_2\sigma_{II}) \\ \frac{(\lambda_1\sigma_{zz} + \lambda_2\sigma_{II}) - \lambda_1^2\sigma_{yz}^2\sin^2}{(2\varepsilon)} + \varepsilon_s \end{pmatrix}. \quad (16)$$

The capacitance difference of two differently orientated sensors is, $$C_{\theta 1} - C_{\theta 2} = \quad (17)$$
$$\frac{C_0}{4\varepsilon}[(\sigma_{xx} - \sigma_{yy})(\varepsilon + \sigma_{zz}\lambda_1 + \sigma_{II}\lambda_2) + \sigma_{yz}^2\lambda_1]\lambda_1(\cos 2\theta_1 - \cos 2\theta_2).$$

From Eq.(17), it can be seen when the normal stress contribution is much less than the shear stress contribution, $$(\sigma_{xx} - \sigma_{yy})(\varepsilon + \sigma_{zz}\lambda_1 + \sigma_{II}\lambda_2)\lambda_1 = (\sigma_{xx} - \sigma_{yy})(\varepsilon + \Delta\varepsilon_{zz})$$
$$\lambda_1 \ll \sigma_{yz}^2\lambda_1^2, \quad (1)$$

Eq.(17) reduces to $$C_{\theta 1} - C_{\theta 2} = \frac{C_0}{4\varepsilon}\sigma_{yz}^2\lambda_1^2(\cos 2\theta_1 - \cos 2\theta_2), \quad (19)$$

which indicates when normal stress contribution is negligible, two stress-dielectric coefficients, $\lambda_1$ and $\lambda_2$, can be decoupled, and $\lambda_1$ can be obtained by extracting signals from two differently oriented sensors as well.

If these two sensors are mutually perpendicularly oriented to each other, their capacitance difference should be, $$C_\theta - C_{\theta + \pi/2} = C_0 \frac{\alpha_1^2 \cos 2\theta}{8\varepsilon}\gamma^2, \quad (20)$$

in terms of strain, or $$C_\theta - C_{\theta + \pi/2} = C_0 \frac{\lambda_1^2 \cos 2\theta}{2\varepsilon}\sigma_{yz}^2, \quad (21)$$

in terms of stress.

EXAMPLES

The following Examples are an illustration of one or more examples of embodiments of carrying out the invention and are not intended as to limit the scope of the invention.

Example 1

Materials

In this study, a fresh FAG Arcanol Load 460 lubricant grease and its mixtures with 1.5% by weight of iron particle with diameter of 50-60 µm, copper particle with diameter of 70-80 µm, nylon powder with dimension of 200-500 µm, and DI water were chosen for investigation. Iron ("Fe"), Copper ("Cu"), nylon, and water are four of the main factors causing the grease failure. The dielectric constants of this grease and its four mixtures were measured by an Agilent E4980A LCR meter at a frequency of 10 kHz, and are listed in Table 1. A detailed description of the dielectric measurement was discussed in Ref [11].

TABLE 1

Dielectric constants of the grease Arcanol Load 460 and its mixtures with different additives.

|  | Fresh | 1.5% Fe | 1.5% Cu | 1.5% Nylon | 1.5% DI water |
|---|---|---|---|---|---|
| Dielectric constant, $\varepsilon$ | 2.35 | 2.40 | 2.39 | 2.36 | 2.38 |

Experimental Setup and Procedure

Figure 4:
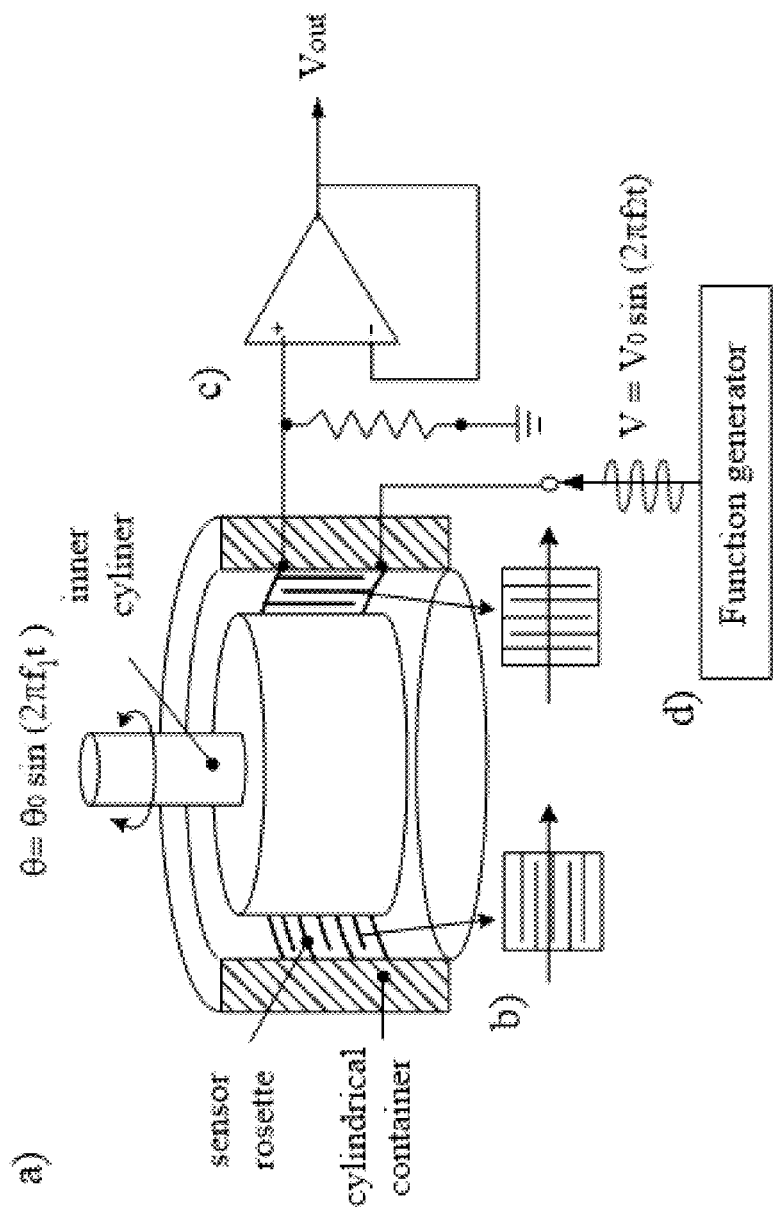
FIG. 4 is an illustration of experiment setup and sensor mounting.

Referring to FIG. 4, experiment setup and sensor mounting is shown. As can be seen at: (a) the rheometer produces oscillatory shear flow between two concentric cylinders ($\theta_0=\gamma_0 (R_2-R_1)/R_1$); at (b) two planar sensors are attached to the fixed cylinder parallel-to-flow and perpendicular-to-flow; at (c) the circuit detects the sensors' responses; and in (d) the function generator provides excitation voltage of 5V ($V_0=7.07V$) with varying frequency, $f_2$.

More specifically, an AR-1000 rheometer (TA Instruments) with a coaxial cylindrical system, as shown in FIG. 4(a), provides an oscillatory shear flow between two concentric cylinders and records the rheological responses. The external cylindrical container (with inner radius $R_2=18$ mm) is fixed, while the inner cylinder (with radius $R_1=17$ mm and immersion depth $H=20$ mm) rotates. FIG. 4(b) shows a sensor rosette attached to the inner surface of the external cylinder with the electrodes of one sensor perpendicular to the flow direction and the electrodes of the other sensor parallel to the flow direction. The width and distance between the two adjacent electrodes are $2w=2a=0.3$ mm. The circuit [12-14] in FIG. 4(c) is used to register small variations in the capacitance of the sensor caused by the flow. The excitation voltage provided by a function generator (Stanford Research DS345) in FIG. 4(d) has 7.07 V in amplitude with frequency varying at 0.1 Hz and 10 kHz. The large resistance, $R$ (~1 G$\Omega$), ensures a nearly constant charge Q on the sensor electrodes. By neglecting the effect of curvature of the sensor rosette mounted on the inner surface of the outer cylinder, the variation of voltage, $\Delta V$, across the electrodes is related to the change of capacitance, $\Delta C$, by, $$\frac{\Delta V}{V^0} = -\frac{\Delta C}{C} = -\frac{\Delta \varepsilon}{\varepsilon + \varepsilon_S}, \quad (22)$$

where $V^0$ is the voltage between the electrodes before deformation, and $\Delta \varepsilon$ is the variation of the dielectric constant with deformation. Parameter $\varepsilon_s$ represents the dielectric constant of the electrode substrate, which is estimated to be 47.73 [11]. Equation (22) allows us to obtain the change of dielectric constant, $\Delta \varepsilon$ of testing sample by measuring the voltage across the electrodes $V^0$ before deformation and its variation $\Delta V$ due to deformation, but without knowing the sensor capacitance C as described in Eq. (11).

At small deformations, the voltage outputs due to the dielectrostrictive responses measured by the electrodes parallel to the flow direction, $\theta=0°$, and perpendicular to the flow direction, $\theta=90°$, in terms of strain can be expressed as below, based on Eqs. (14) and (22), $$\Delta V_\parallel = -\frac{2\varepsilon\alpha_1 + 4\varepsilon\alpha_2}{8\varepsilon(\varepsilon+\varepsilon_s)}\gamma^2 V^0, \text{ and} \quad (23)$$

$$\Delta V_\perp = -\frac{2\varepsilon\alpha_1 + 4\varepsilon\alpha_2 - \alpha_1^2}{8\varepsilon(\varepsilon+\varepsilon_s)}\gamma^2 V^0.$$

These equations show that the variations of voltage due to a shear flow are quadratic with the shear strain, $\gamma=\gamma_0 \sin(2\pi f)t$. Therefore, the dielectrostriction response may be measured at double the frequency of the mechanical oscillations, 2f. Moreover, when the signal is measured at double the frequency of the oscillation, as long as the normal stress contribution, $(\sigma_{xx}-\sigma_{yy})\Delta\varepsilon_\parallel\lambda_1$, is much less than the shear stress contribution, $\sigma_{yz}^2\lambda_1^2$, (see Eq.(18)), the normal stress contribution can be neglected, since $(\sigma_{xx}-\sigma_{yy})\varepsilon\lambda_1$ in Eq. (18) is a first harmonic function.

During tests, grease samples were placed into the gap between the two concentric cylinders of the rheometer and the measurements were conducted at 23° C. In the time sweep mode, the mechanical oscillation frequency was set to be 5 Hz, and the shear strain amplitude varied from 15% to 30% with an increment of 5% (the corresponding shear rate was from 4.71 s$^{-1}$ to 9.42 s$^{-1}$) for all grease samples. The above frequency and shear strain range were selected to obtain strong dielectrostriction signals without exceeding the maximum torque capacity of the rheometer.

The voltage variations, $\Delta V_\perp$ and $\Delta V_\parallel$, from perpendicular-to-flow and parallel-to-flow sensors, were digitally recorded at 100 kHz sampling rate. The output signals were processed with a fast Fourier transform of the measured data. The shear strain and the corresponding shear stress were recorded by the rheometer simultaneously with the voltage outputs. Each grease sample was tested five times.

Example 2

Rheological Responses

Figure 5:
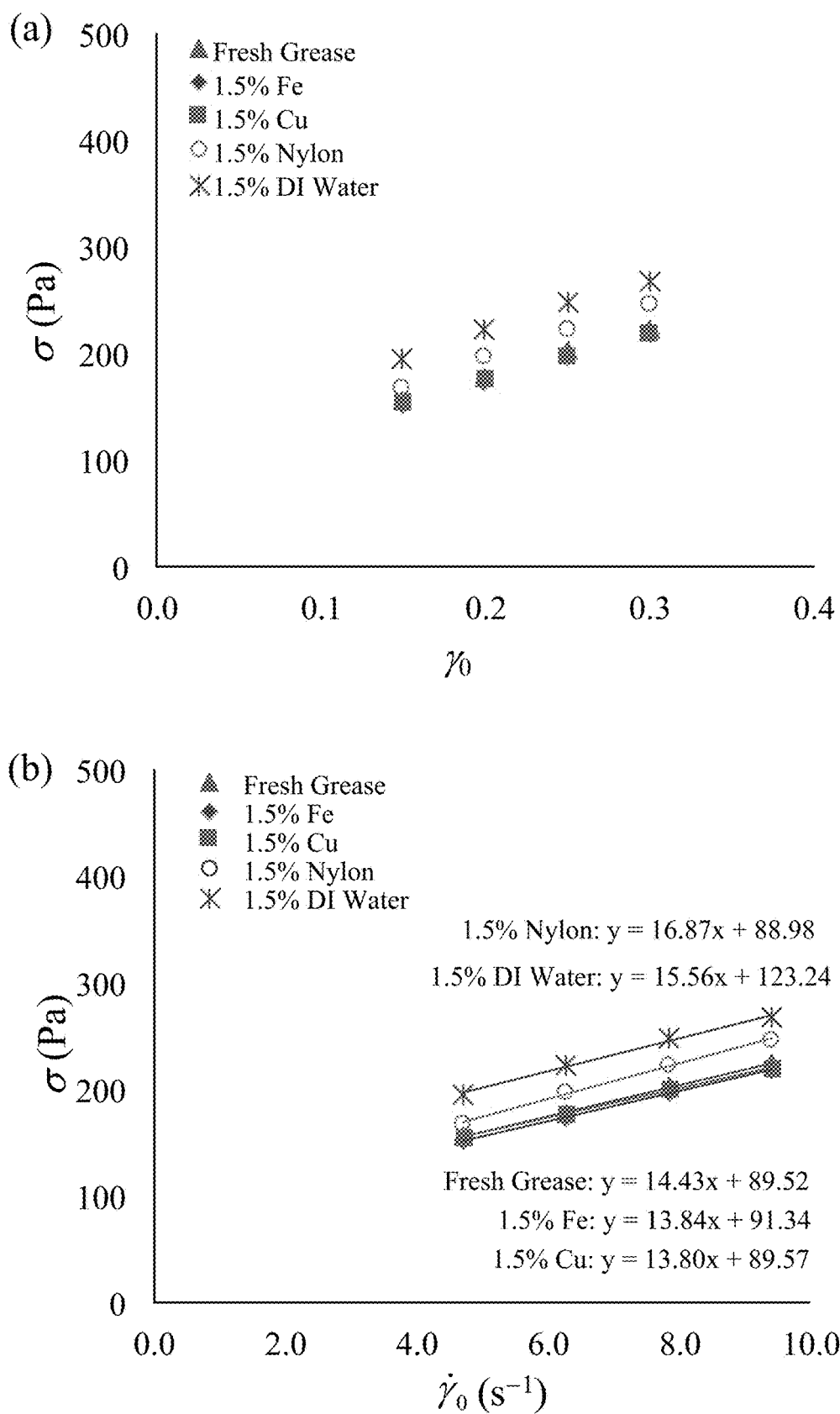
FIG. 5 shows graphs illustrating shear stress-shear strain profiles (a) and shear stress-shear rate profiles (b) of fresh grease and its mixtures with 1.5% by weight of iron particles, copper particles, nylon powders, and Deionized ("DI") water measured with a rheometer at a mechanical oscillation frequency of 5 Hz and strain amplitudes varied from 15 to 30%; the value of each plotted point representing the mean of a total of 5 measurements for each material system.

FIG. 5 presents shear stress vs. shear strain curves (in FIG. 5 (a)) and the shear stress vs. shear rate curves (in FIG. 5 (b)) of fresh FAG Arcanol Load 460 lubricant grease and its mixtures with 1.5% by weight of iron particle, copper particle, nylon powder, and DI water during oscillatory shear flow. In the shear rate range applied in this study, all the grease samples exhibited Bingham behavior—each grease sample started to flow above a critical value (e.g. yield stress) which varied with species, and then the shear stress increased linearly with the shear rate as shown in FIG. 5(b). By using the Bingham model, $\sigma=\sigma_y+\eta\dot\gamma$, where $\eta$ is viscosity and $\dot\gamma$ is shear rate, the yield stress $\sigma_y$ for each sample is estimated and listed in Table 2 along with its viscosity.

TABLE 2

The yield stresses and viscosities of the grease Arcanol Load 460 and its mixtures with different additives

|  | Fresh | 1.5% Fe | 1.5% Cu | 1.5% Nylon | 1.5% DI water |
|---|---|---|---|---|---|
| Yield stress (Pa) | 14.43 | 13.84 | 13.80 | 16.87 | 15.56 |
| Viscosity (Pa · s) | 89.52 | 91.34 | 89.57 | 88.98 | 123.24 |

Strain-Dielectric and Stress-Dielectric Relationships

Figure 6:
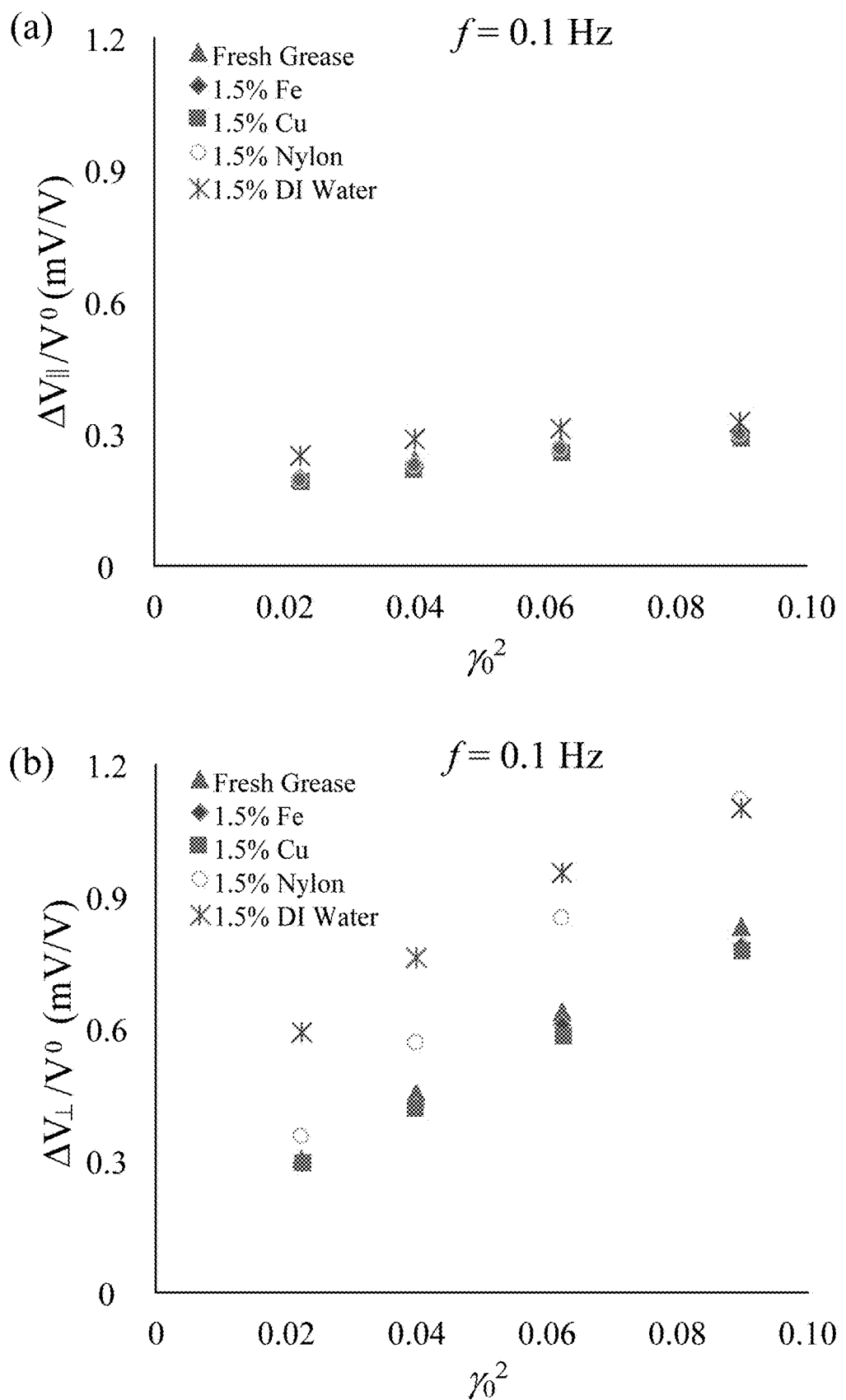
FIG. 6 shows graphs illustrating the strain-dielectric relationships of fresh grease and its mixtures with 1.5% by weight of iron, copper, nylon, and DI water, respectively, at an excitation frequency, f=0.1 Hz: (a) The output voltage, $\Delta V_{\parallel}/V_0$ obtained by the parallel-to-flow sensor, and (b) $\Delta V_{\perp}/V_0$ obtained by the perpendicular-to-flow sensor are presented in terms of the square of the shear strain amplitude, $\gamma_0^2$.
Figure 7:
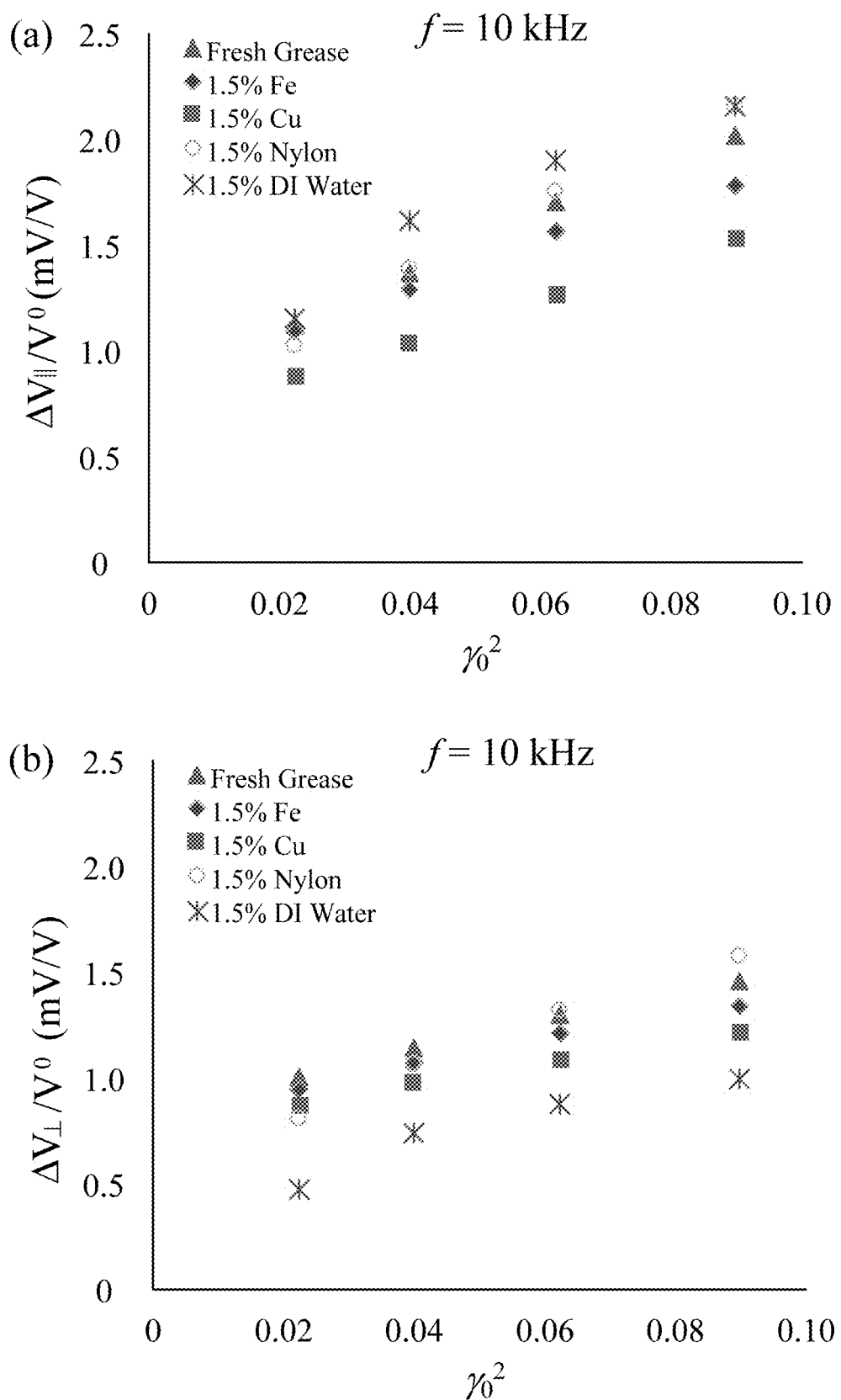
FIG. 7 shows graphs illustrating the strain-dielectric relationships of fresh grease and its mixtures with 1.5% by weight of iron, copper, nylon, and DI water, respectively, at an excitation frequency, f=10 kHz: (a) The output voltage, $4V_{\parallel}/V_0$ obtained by the parallel-to-flow sensor, and (b) $\Delta V_{\perp}/V_0$ obtained by the perpendicular-to-flow sensor are presented in terms of the square of the shear strain amplitude, $\gamma_0^2$.
Figure 8:
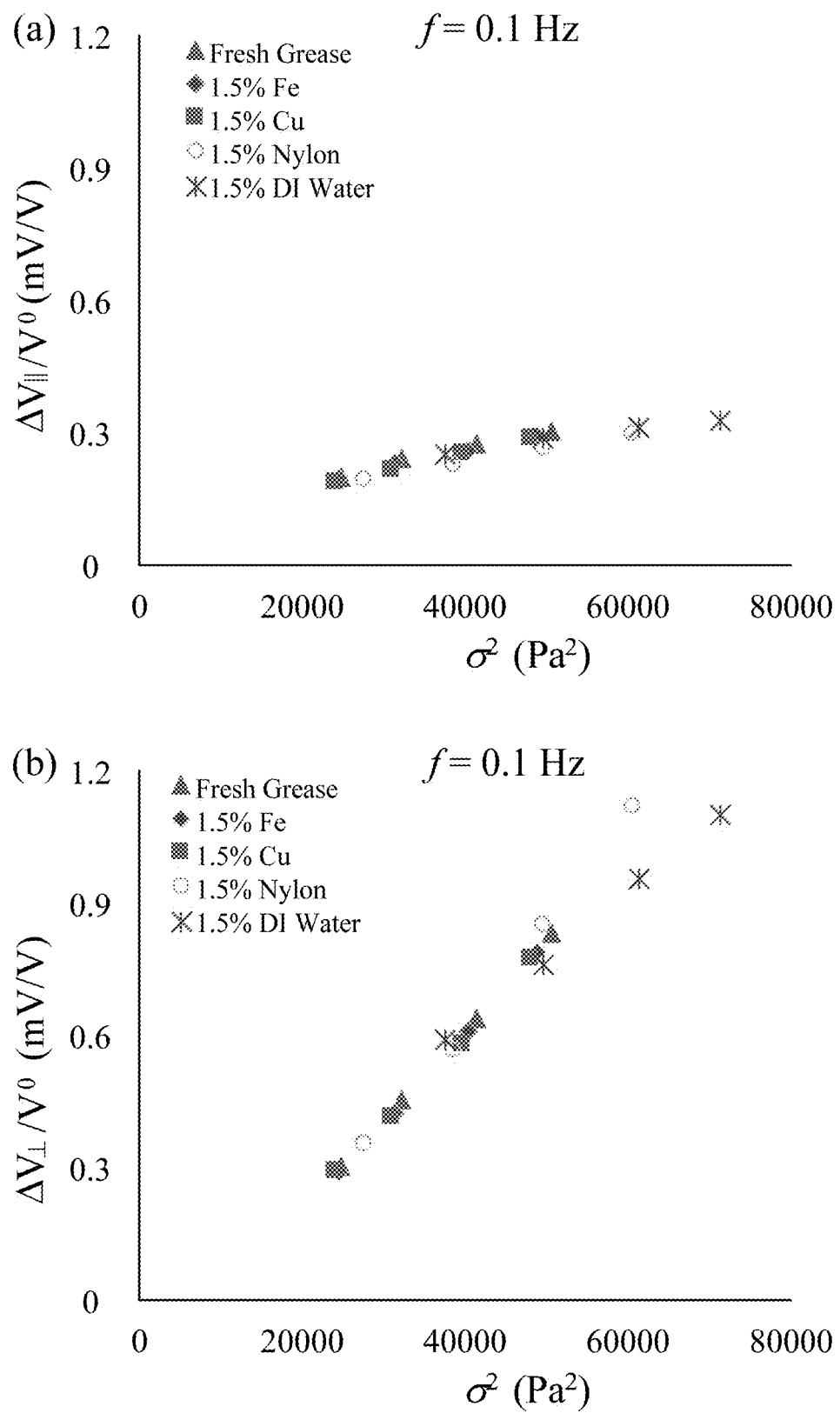
FIG. 8 shows graphs illustrating the stress-dielectric relationships of fresh grease and its mixtures with 1.5% by weight of iron, copper, nylon, and DI water, respectively, at an excitation frequency, f=0.1 Hz: (a) The output voltage, $\Delta V_{\parallel}/V_0$ obtained by the parallel-to-flow sensor, and (b) $\Delta V_{\perp}/V_0$ obtained by the perpendicular-to-flow sensor are presented in terms of the square of the shear stress, $\sigma^2$.
Figure 9:
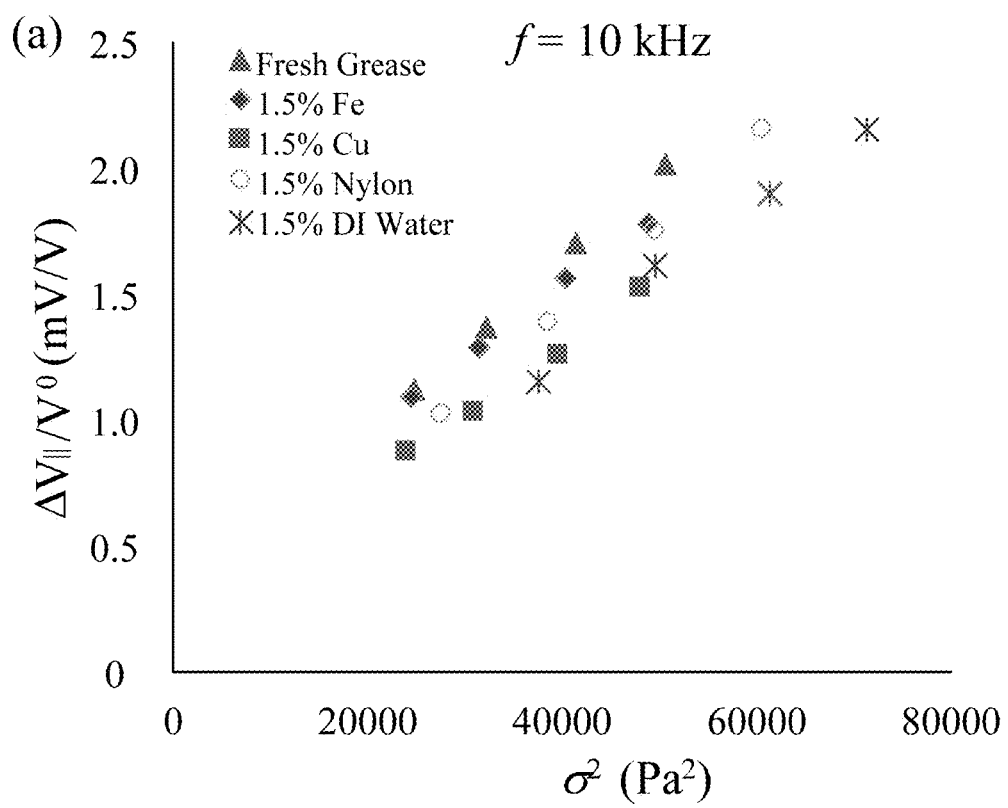
FIG. 9 shows graphs illustrating the stress-dielectric relationships of fresh grease and its mixtures with 1.5% by weight of iron, copper, nylon, and DI water, respectively, at an excitation frequency, f=10 kHz: (a) The output voltage, $\Delta V_{\parallel}/V_0$ obtained by the parallel-to-flow sensor, and (b) $\Delta V_{\perp}/V_0$ obtained by the perpendicular-to-flow sensor are presented in terms of the square of the shear stress, $\sigma^2$.
Figure 9:
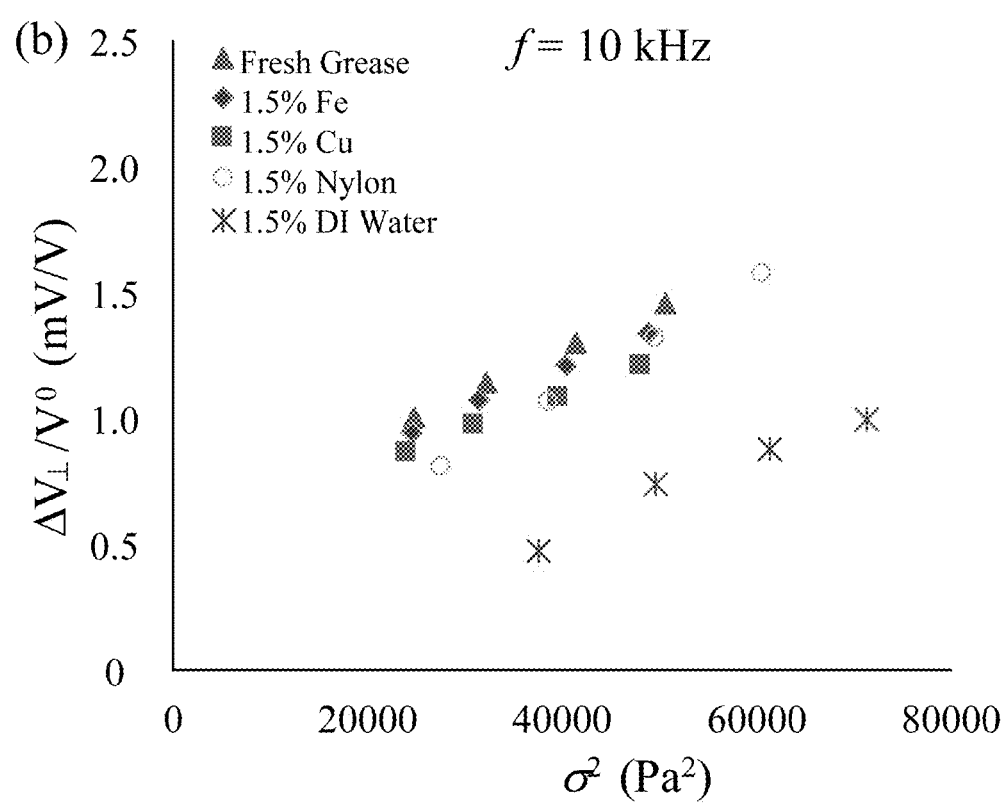

The strain-dielectric relationships of all the grease samples are shown in FIGS. 6(a) and 6(b) for excitation frequency of 0.1 Hz, and in FIGS. 7(a) and 7(b) for excitation frequency of 10 kHz respectively in terms of the square of the strain amplitude, $\gamma_0^2$, where $\Delta V_\parallel/V^0$ is the output voltage obtained by the parallel-to-flow sensor divided by the voltage across the sensor before deformation (see FIG. 6(a) and FIG. 6(b)), while $\Delta V_\perp/V^0$ is the output voltage obtained by the perpendicular-to-flow sensor divided by the voltage across the sensor before deformation (see FIG. 7(a) and FIG. 7(b)). The stress-dielectric relationships of the grease samples obtained by parallel-to-flow and perpendicular-to-flow sensors are shown in FIGS. 8(a) and 8(b) for excitation frequency of 0.1 Hz, and in FIGS. 9(a)

and 9(b) for excitation of 10 kHz, where the dielectrostrictive signals are presented in terms of the square of the shear stress, $\sigma^2$, as well.

Figure 10:
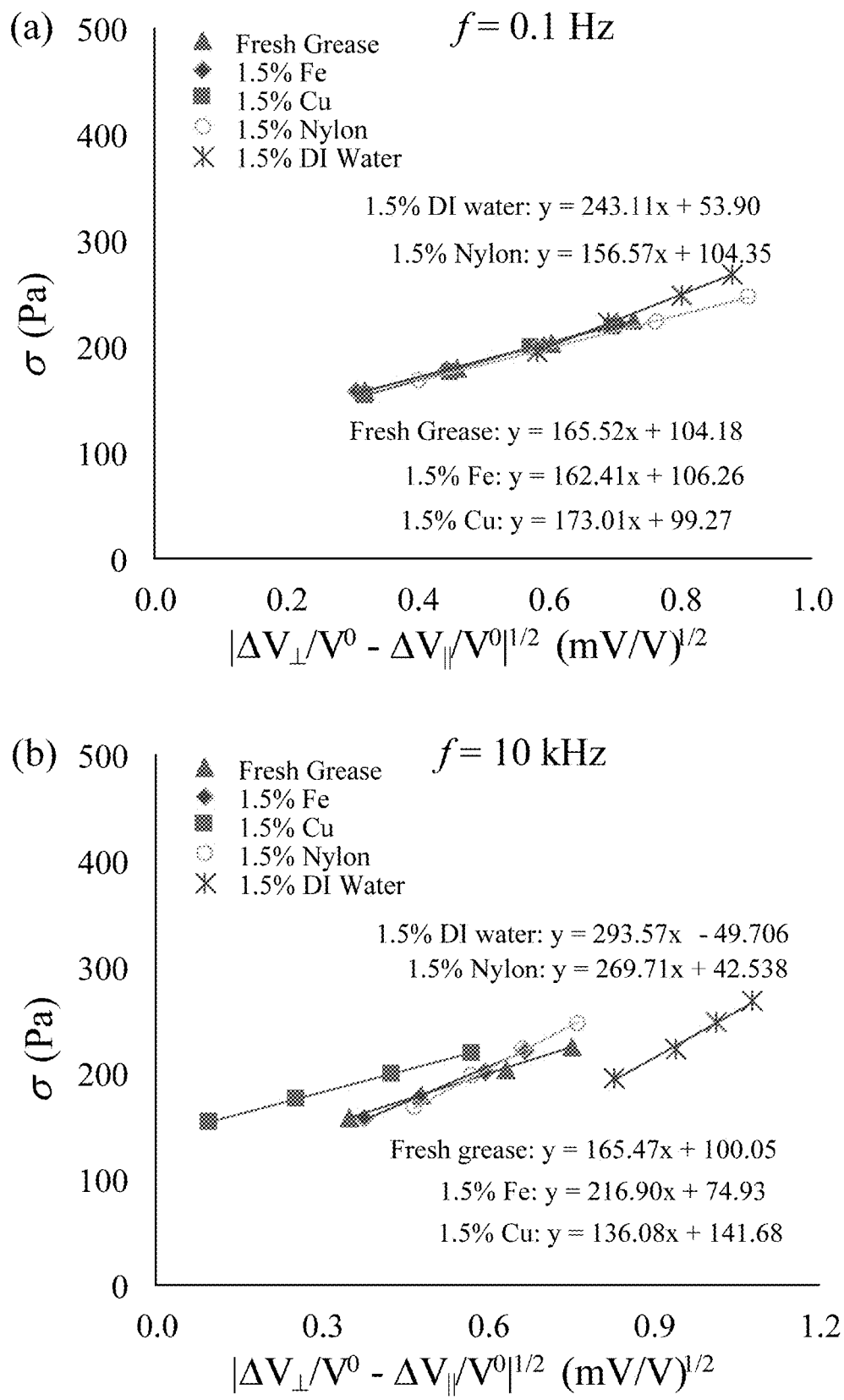
FIG. 10 shows graphs illustrating the square root of the extracted signal, $|\Delta V_{\perp}/V_0 - \Delta V_{\parallel}/V_0|^{1/2}$, from the parallel-to-flow and perpendicular-to-flow sensors vs. shear stress $\sigma$ for excitation frequencies of (a) 0.1 Hz, and (b) 10 kHz; the values of extracted signals being calculated based on the mean values of the dielectrostrictive signals presented in FIGS. 4-7.

FIGS. 10(a) and 10(b) present the square root of the extracted signals, $|\Delta V_\perp/V^0 - \Delta V_\parallel/V^0|^{1/2}$, from the parallel-to-flow and perpendicular-to-flow sensors in terms of the shear stress, $\sigma$, for excitation frequencies of 0.1 Hz and 10 kHz, respectively. From these two Figures, it can be seen that for each material system the square root of the extracted dielectrostrictive signal increases linearly with the shear stress above its critical stress. As indicated previously, such linear correlations indicate that for the fresh grease and all its mixtures, the change in the dielectric constant, $\Delta\varepsilon$, is proportional to the shear stress, $\sigma$, above the critical stress. However, differences have been found between the yield stresses obtained by the dielectrostriction method (that is, the intercepts of the stress-dielectric curves in FIGS. 10(a) and 10(b)) and the rheological method (see FIG. 5(b) and Table 2), which might be attributed to the measurement errors, the mismatch of two sensors due to fabrication inaccuracy, and/or the leaking current caused by the movement of the free charges in the grease samples upon the application of the excitation voltage. Moreover, in the rheological method the yield stresses were predicted by the Bingham model based on the rheological behaviors of the grease samples in the applied shear rate range. However, the shear rate range applied in this study is very small, only up to 9.42 s$^{-1}$. In the wider shear rate range, the grease and its mixtures may exhibit different rheological behaviors [15, 16], therefore the employment of the Bingham model might lead to inaccurate estimation of the yield stresses.

First Stress-Dielectric Coefficient, $\lambda_1$

Combining Eqs. (21) and (22) yields the following expression, $$|\lambda_1| = \frac{1}{\sigma_{yz}} \sqrt{2\varepsilon(\varepsilon + \varepsilon_s)|\Delta V_\perp - \Delta V_\parallel|/V^0}, \quad (24)$$

which indicates that the first stress-dielectric coefficient $\lambda_1$ can be obtained by extracting signals from the perpendicular-to-flow and the parallel-to-flow sensors. Acquisition of the second stress-dielectric coefficient, $\lambda_2$, requires the knowledge of all stress components.

The absolute values of the first stress-dielectric coefficient, $|\lambda_1|$, for the fresh grease and its mixtures at the excitation frequencies of 0.1 Hz and 10 kHz are presented in terms of shear rate, $\dot{\gamma}_0$, in FIGS. 11(a) and 11(b), respectively. From these two Figures, one can see that the first stress-dielectric coefficient, $\lambda_1$, is nearly independent of shear rate for all material systems. It further supports the existence of a linear relationship between the change in dielectric constant, $\varepsilon$, and the shear stress, $\sigma$, in the fresh grease and its mixtures.

The $\lambda_1$ of each material system acquired at 30% strain amplitude (9.42 s$^{-1}$ shear rate) for both excitation frequencies of 0.1 Hz and 10 kHz is listed as representative value in Table 3. It has been found, although the dielectric constant varies a little—only about 2.1% among the grease and its mixtures (see Table 1)—the first stress-dielectric coefficient, $\lambda_1$, varies significantly among these material systems. Moreover, at different excitation frequencies of 0.1 Hz and 10 kHz, the first stress-dielectric coefficient exhibits different trends for the grease mixtures with different additives compared to the fresh grease. For instance, at 0.1 Hz the addition of either iron ("Fe") or copper ("Cu") does not change $\lambda_1$ significantly, only about 3.5% and −0.9% respectively, while at 10 kHz the addition of Fe reduces $\lambda_1$ by about 25.3%, and the addition of Cu increases $\lambda_1$ by about 19.5%. At 0.1 Hz, the addition of nylon increases $\lambda_1$ by about 8.9%, while at 10 kHz the addition of nylon reduces $\lambda_1$ by about 48.0%. At 0.1 Hz, the addition of deionized ("DI") water reduces $\lambda_1$ by about 19.5%, while at 10 kHz the addition of DI water reduces $\lambda_1$ by about 33.3.

The stress-dielectric coefficient, and therefore dielectrostrictive response, are more sensitive than the dielectric constant to the additives. This might be contributed to the fact that the additives, such as Fe, Cu, nylon, and DI water, may alter both rheological and dielectric properties of grease. In the dielectrostriction measurement, both mechanical and electrical fields play an important role. Therefore, the change of both rheological and dielectric properties can be captured. While in the dielectric constant measurement, only the electrical field works. Therefore, only the change in electrical property can be detected.

The reason why the grease and its mixtures with different additives exhibit different dielectrostrictive responses at different excitation frequencies may depend on various factors, examples of which include but are not limited to, the characteristic polarization mechanisms at 0.1 Hz and 10 kHz are different—ionic relaxation and dipolar relaxation, respectively. The conductive material (such as Fe and Cu) and its oxides (the products of the reaction between metal particles and oxidative radicals in grease), non-polar materials (such as base oil in the grease), or polar materials (such as nylon and DI water) may have their own main polarization mechanism and different polarizability, and therefore would possess different dielectric responses and the stress-dielectric coefficients in the different excitation frequencies. The different dielectric responses between the addition of Fe and Cu may be attributed to the different valence state of Fe and Cu in grease. During the thermal and oxidation degradation process of grease, Fe and Cu metals tend to react with the oxidative radicals and acid products, and the derived metal oxide mixture contains several valence states because of the reduction potential difference. The ferrous oxide and copper oxide may possess different dielectric properties.

Figure 11:
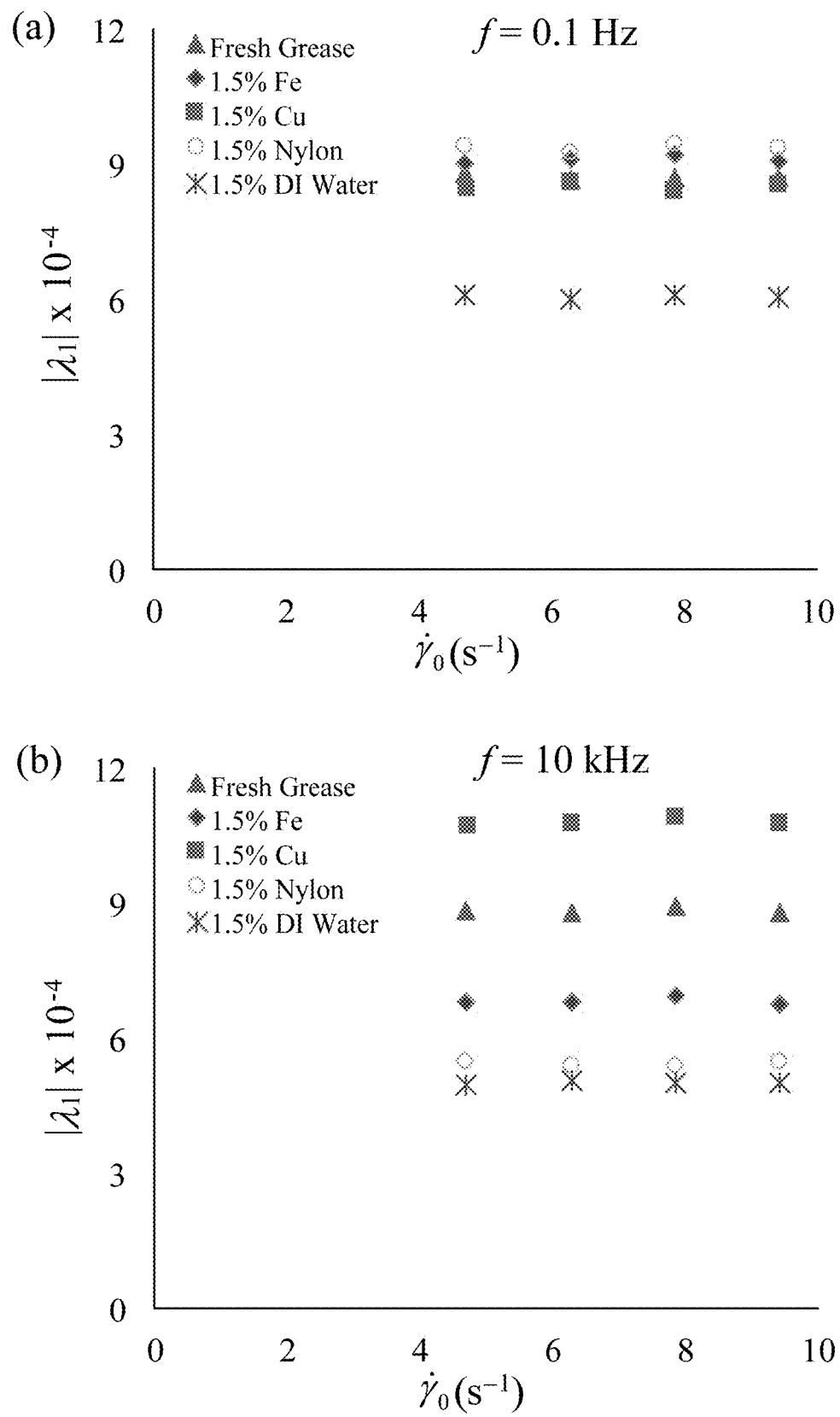
FIG. 11 shows graphs illustrating the absolute value of the stress-dielectric coefficients, $|\lambda_1|$, of grease presented in terms of shear rate, $\dot{\gamma}_0$ for excitation frequency of (a) 0.1 Hz, and (b) 10 kHz, respectively; the values of the first stress-dielectric coefficient being calculated based on the mean values of the dielectrostrictive signals presented in FIGS. 4-7.

Referring to FIG. 11, the absolute value of the stress-dielectric coefficients, $|\lambda_1|$, of grease is presented in terms of shear rate, $\dot{\gamma}_0$ for excitation frequency of (a) 0.1 Hz, and (b) 10 kHz, respectively. The values of the first stress-dielectric coefficient were calculated based on the mean values of the dielectrostrictive signals presented in FIGS. 4-7.

TABLE 3

The first stress-dielectric coefficient, $|\lambda_1|$, of the grease Arcanol Load 460 and its mixtures with different additives obtained at excitation frequencies of 0.1 Hz and 10 kHz.

| $\lambda_1 \times 10^{-4}$ (m$^2$/N) | Fresh | 1.5% Fe | 1.5% Cu | 1.5% Nylon | 1.5% DI water |
|---|---|---|---|---|---|
| at 0.1 Hz | 8.64 | 8.94 | 8.56 | 9.41 | 6.96 |
| at 10 kHz | 8.89 | 6.64 | 10.62 | 4.62 | 5.93 |

Example 3

In the situation where strain and stress fields are not known, but only shear rate is known, shear rate can be used as state variable of deformation. As an example, the same samples, experimental setup, and experimental procedure in Example 1 and Example 2 may be used. The shear rate, $\dot{\gamma}$, is used as state variable of deformation, and its value at 9.42 s$^{-1}$ is considered for further calculation.

Recall the capacitance difference of two mutually perpendicularly oriented sensors when dielectric material is under shear deformation or shear flow, $$C_\theta - C_{\theta+\pi/2} = C_0 \frac{\lambda_1^2 \cos 2\theta}{2\varepsilon} \sigma_{yz}^2.$$

If the electrodes of one sensor is parallel to flow direction and the electrodes of other sensor is perpendicular to flow direction, the above equation becomes, $$C_0 - C_{\pi/2} = C_0 \frac{\lambda_1^2}{2\varepsilon} \sigma_{yz}^2, \quad \text{(A.1)}$$

For a grease with a yield stress $\sigma_Y$, the stress-shear rate relationship can be expressed in the general form, $$\sigma_{yz} = \sigma - \sigma_Y = \eta \dot{\gamma}. \quad \text{(A.2)}$$

where the grease viscosity, $\eta$, is a function of shear rate, $\dot{\gamma}$. Substituting Eq. (A.2) into Eq. (A.1), the capacitance difference between the two sensors can be expressed in terms of shear rate, $$C_0 - C_{\pi/2} = \frac{C^0}{2}\left(\frac{\eta \lambda_1}{\sqrt{\varepsilon}}\right)^2 \dot{\gamma}^2. \quad \text{(A.3)}$$

By combing Eq. (A.3) and Eq.(16) which describes the relationships among the voltage drop across a sensor, sensor capacitance, and dielectric constant of dielectric material, $$\frac{\Delta V}{V^0} = -\frac{\Delta C}{C} = -\frac{\Delta \varepsilon}{\varepsilon + \varepsilon_S},$$

the rheo-dielectric coefficient of the dielectric material, $\eta \lambda_1 / \sqrt{\varepsilon}$, can be obtained, $$|\eta \lambda_1 / \sqrt{\varepsilon}| = \frac{1}{\dot{\gamma}} \sqrt{2(\varepsilon + \varepsilon_s)|\Delta V_\perp - \Delta V_\parallel|/V^0}. \quad \text{(A.4)}$$

where the dielectric constants, $\varepsilon$ and $\varepsilon_s$ of the dielectric material before deformation and sensor substrate are measured by LCR meter, the output voltage, $\Delta V_\parallel / V_0$ is measured by a parallel-to-flow sensor, and $\Delta V_\perp / V_0$ is measured by the perpendicular-to-flow sensor, as discussed hereinabove.

Considering a shear rate at 9.42 s$^{-1}$, the corresponding rheo-dielectric coefficients of fresh Arcanol Load 460 grease and the grease mixtures with 1.5% by weight iron, copper, nylon, and DI water at 0.1 Hz and 10 kHz electrical excitation frequencies are presented in Table 4.

TABLE 4

The rheo-dielectric coefficient, $|\eta \lambda_1/\sqrt{\varepsilon}|$, of the grease Arcanol Load 460 and its mixtures with different additives obtained at excitation frequencies of 0.1 Hz and 10 kHz.

| $|\eta \lambda_1/\sqrt{\varepsilon}| \times 10^{-2}$ (s) | Fresh | 1.5% Fe | 1.5% Cu | 1.5% Nylon | 1.5% DI water |
|---|---|---|---|---|---|
| at 0.1 Hz | 5.05 | 5.27 | 4.96 | 5.45 | 5.56 |
| at 10 kHz | 5.19 | 3.91 | 6.15 | 2.68 | 4.74 |

Advantageously, the observation of: 1) the linear stress-dielectric relationship in grease and its mixtures; 2) the high sensitivity of the stress-dielectric coefficient, $\lambda_1$, to the grease composition change; and 3) the different trends of $\lambda_1$ at different excitation frequency for different additives, indicates that the dielectrostriction measurement provides a new approach to the rheological study, stress measurement, and failure prediction of grease, and confirms its feasibility of differentiating different types of grease degradations and failure modes. Moreover, the dielectrostrictive sensor used in this study has a planar configuration and can be easily scaled down to a very small size, which makes dielectrostriction measurement a practical tool for both off-line grease examination and on-line grease performance monitoring. In some examples of embodiments of the system, an additional device is provided which is capable of measuring rheological properties. For instance, as a non-limiting illustrative example, for on-line grease performance monitoring in a bearing in a wind turbine, shear flow between cage and outer ring is produced by rotation of cage, which is caused by wind. A sensor can be attached to the surface of outer ring. A tachometer can be used to record rotation speed of cage. Based on rotation speed and distance between outer ring and cage, the shear rate at outer ring surface can be calculated.

The invention described herein relates to the dielectrostriction effect and the stress-dielectric relationship of grease and its mixtures. Dielectrostriction measurement is utilized to observe the variation of the dielectric constant of the grease during shear flow, and obtain the first stress-dielectric coefficient, $\lambda_1$, at different excitation frequencies. Above the yield stress, the grease starts to flow with the change of dielectric constant of the grease increasing linearly with stress. For different additives, the first stress-dielectric coefficient, $\lambda_1$, shows different trends at different excitation frequencies. The linear stress-dielectric relationship, the sensitivity of $\lambda_1$ to grease composition change, and different trends of $\lambda_1$ at different excitation frequencies for different additives provides that such a dielectrostriction measurement is a novel approach to the rheological study, stress measurement, failure prediction, and failure mode diagnosis of grease, which can be used as a practical tool for both off-line grease examination and on-line grease performance monitoring.

The system and methods described herein may be implemented in or by software (for example, to perform data analysis). To this end, the methods may be implemented in a general-purpose software package or a specific purpose software package. Likewise, the system and methods described herein could include performing data analysis manually. The system may comprise a sensor, voltage source, and systems for analyzing sample data.

As described herein, in one or more examples of embodiments, the system, method, and devices described, or method embodied by software, may be implemented by a computer system or in combination with a computer system.

The computer system may be or include a processor. The computers for use with the methods and various components described herein may be programmable computers which may be special purpose computers or general purpose computers that execute the system according to the relevant instructions.

The computer can also include a display, provision for data input and output, etc. Furthermore, the computer or computers may be operatively or functionally connected to one or more mass storage devices, such as, but not limited to, a database. The memory storage can be volatile or non-volatile and can include removable storage media. The system may also include computer-readable media which may include any computer readable media or medium that may be used to carry or store desired program code that may be accessed by a computer. The invention can also be embodied as computer readable code on a computer readable medium. To this end, the computer readable medium may be any data storage device that can store data which can be thereafter read by a computer system.

The systems and devices described may include physical hardware and firmware configurations, along with hardware, firmware, and software programming that is capable of carrying out the currently described methods.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

NOMENCLATURE a, A distance (m)
C capacitance (F)
frequency (Hz)
f
h thickness (m)
l, L length (m)
Q electrical charge (C)
R resistance (Ω)
t time (s)
V voltage (V)
w, W width (m)
$\varepsilon_0$ permittivity of free space, $8.85 \times 10^{-12}$(F/m)
$\varepsilon$ dielectric constant, dimensionless
n refractive index, dimensionless
η viscosity, Pa·s
θ angle (°)
γ engineering shear strain, dimensionless
$C_1$, $C_2$ stress-optical coefficients, $Pa^{-1}$
$\alpha_1$, $\alpha_2$ strain-dielectric coefficients, dimensionless
$\lambda_1$, $\lambda_2$ stress-dielectric coefficients, $Pa^{-1}$
$\varepsilon_{ij}$ dielectric constant tensor
$n_{ij}$ refractive index tensor
$\sigma_{ij}$ stress tensor
$u_{ij}$ strain tensor

REFERENCES

1. Landau, L. D., Lifshitz, E. M., and Pitaevskii, L. P., *Electrodynamics of Continuous Media*. 2$^{nd}$ ed. ed. Course of Theoretical Physics. Vol. 8. 1984, Oxford: Butterworth-Heinenann.
2. Stratton, J. A., *Electromagnetic Theory*. 1941, New York: McGraw-Hill.

3. Fuller, G. G., *Optical Rheometry of Complex Fluids.* 1995, New York: Oxford University Press.
4. Janeschitz-Kriegl, H., *Polymer Melt Rheology and Flow Birefringence.* 1983, Berlin: Springer.
5. Saiz, E. and Rainde, E., *Dipole Moments and Birefringence of Polymers.* Prentice Hall Polymer Science and Engineering Series, ed. J. E. Mark. 1992, New Jersey: Prentice-Hall, Inc.
6. Bird, R. B., et al., *Kinetic Theory.* 2 ed. Dynamics of Polymeric Liquids. Vol. 2. 1987, New York: Wiley-Interscience.
7. Peng, Y. Y., Shkel, Y. M., and Kim, G. H., *Stress Dielectric Response in Liquid Polymers.* J. Rheol., 2005. 49(1): p. 297-311.
8. Peng, Y. Y., *Rheo-dielectric Studies in Polymeric Systems*, in Mechanical Engineering Department, Ph.D. Thesis, 2008, University of Wisconsin-Madison.
9. Shkel, Y. M., Lee, H. Y., and Peng, Y. Y., Dielectrostrictive Sensor for Measuring Deformation, 2010, U.S. Pat. No. 7,726,199.
10. Peng, Y. Y., Li, H. M., and Turng, L. S., *Development of a Rheo-dielectric Sensor for Online Shear Stress Measurement During the Injection Molding Process.* Polymer Engineering & Science, 2010. 50(1): p. 61-68.
11. Peng, Y. Y., Prochniak, D. J., and Shkel, Y. M., *Rheo-dielectric Study in Polymeric Nano-Suspensions.* in *Proceedings of IMECE.* 2006.
12. Doeblin, E. O., *Measurement Systems: Application and Design.* 4 ed. 1990, New York: McGraw-Hill.
13. Holman, J. P., *Experimental Methods for Engineers.* 6 ed. 1994, New York: McGraw-Hill.
14. Horowitz, P. and Hill, W., *The Art of Electronics.* 1998, London: Cambridge University Press.
15. Meng, Y. G. and Zheng J., *A Rheological Model for Lithium Lubricating Grease*, Tribology International, 1998. 31(10): p. 619-625.
16. Baart, P., Lugt, P. M., and Prakash, B., *Non-Newtonian Effects on Film Formation in Grease-Lubricated Radial Lip Seals*, Tribology Transactions, 2010. 53: p. 308-318.

The invention claimed is:

1. A method for detecting a substance of a dielectric material, the method comprising:
   with one or more devices,
      sweeping electrical excitation at multiple frequencies and applying to the material,
      providing shear deformation or shear flow to the material, and conduct a rheological measurement to obtain at least one of shear strain, shear stress, or shear rate of the material;
   using one or more sensors and one or more processors,
      conducting a dielectrostriction measurement to obtain a change of dielectric constant of the material at multiple frequencies, then by dividing the change of dielectric constant of the material by the shear strain or shear stress, obtaining at least one of a strain-dielectric coefficient data series at the multiple frequencies or a stress-dielectric coefficient data series at the multiple frequencies, the strain-dielectric coefficient data series including a set of strain-dielectric coefficient data for different frequencies, and the stress-dielectric data series including a set of stress-dielectric coefficient data for different frequencies, when a strain field or a stress field is known;
      conducting a dielectrostriction measurement to obtain change of dielectric constant of the material at one or multiple frequencies, and then by dividing the change of dielectric constant of the material by shear rate obtaining a rheo-dielectric coefficient data at a single frequency or a rheo-dielectric coefficient data series at multiple frequencies, the rheo-dielectric coefficient data series including a set of rheo-dielectric coefficient data for different frequencies, when shear rate is known; and
      using the set of strain-dielectric coefficient data, stress-dielectric coefficient data, rheo-dielectric coefficient data and/or rheo-dielectric coefficient data series to perform material monitoring, quality examination, and characterization.

2. The method of claim 1, wherein the material includes a grease, and wherein the using of the set of strain-dielectric coefficient data, stress-dielectric coefficient data, rheo-dielectric coefficient data and/or rheo-dielectric coefficient data series includes determining a dielectrostriction measurement to provide a rheological study, stress measurement, and failure prediction of the grease.

3. The method of claim 2, wherein the using the set of strain-dielectric coefficient data, stress-dielectric coefficient data, rheo-dielectric coefficient data and/or rheo-dielectric coefficient data series further includes, for the material, determining a grease degradation and a failure mode for the grease from a plurality of types of grease degradations and failure modes.

4. The method of claim 1, wherein the one or more sensors is a dielectrostrictive sensor rosette.

5. A system for detecting a substance in a dielectric material, the system comprising:
   a device arranged to deliver an electrical excitation voltage at multiple frequencies to the material;
   a dielectrostrictive sensor for conducting dielectrostriction measurement; and
   a controller configured to
      cause the device to deliver the electrical excitation voltage, including cause the device to sweep the electrical excitation voltage at multiple frequencies, and control the dielectrostrictive sensor, and
      process a dielectrostriction measurement result from the dielectrostrictive sensor to perform material monitoring, quality examination, and characterization.

6. The system of claim 5, wherein the dielectrostrictive sensor for conducting dielectrostriction measurement comprises a sensor rosette.

7. The system of claim 6, wherein the sensor rosette comprises at least two differently oriented capacitive sensors.

* * * * *